J. D. HAYMAN.
SPRING SPOKE WHEEL.
APPLICATION FILED AUG. 4, 1911.
1,118,487. Patented Nov. 24, 1914.
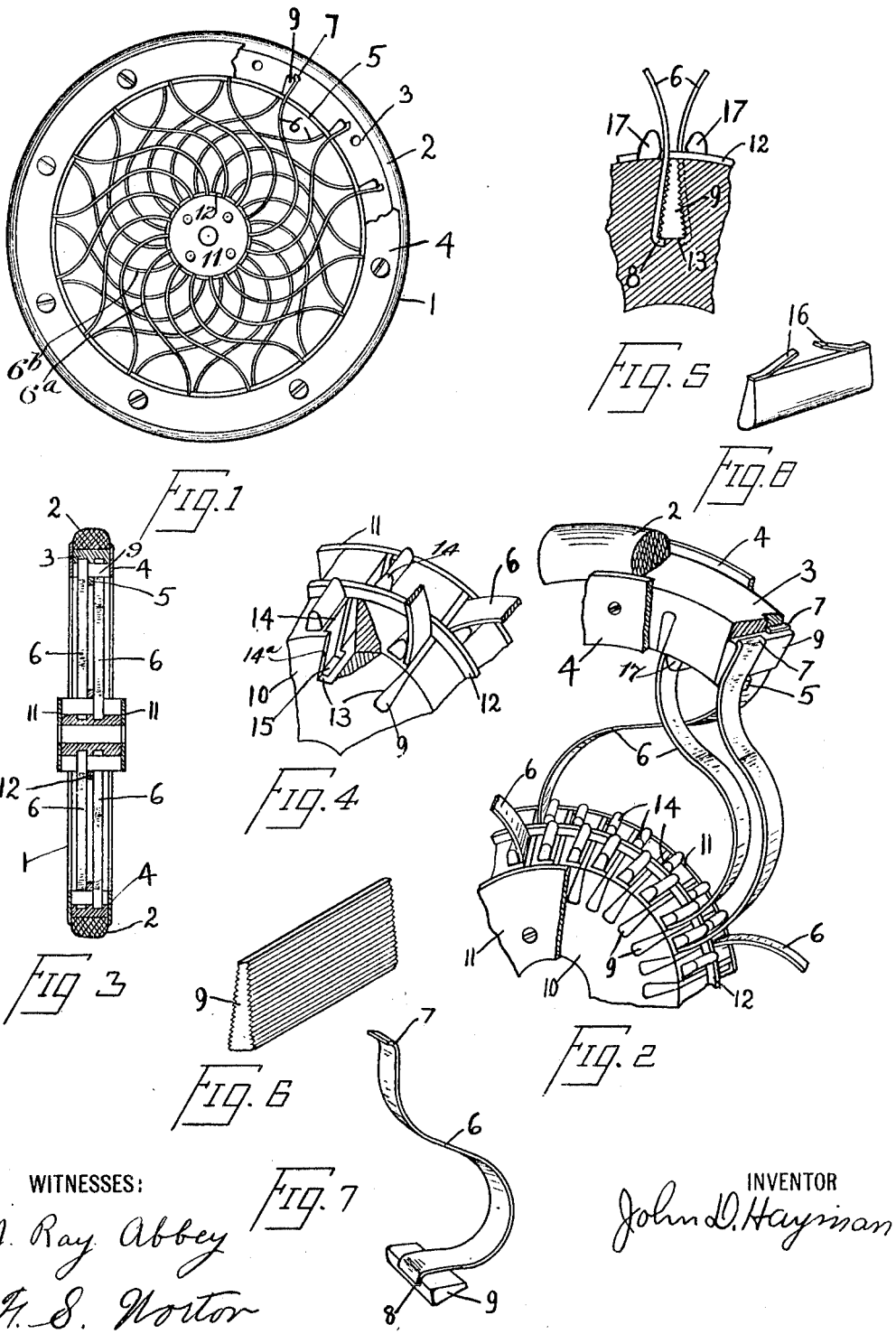
WITNESSES:
J. Ray Abbey
H. S. Norton
INVENTOR
John D. Hayman

UNITED STATES PATENT OFFICE.

JOHN D. HAYMAN, OF SAGINAW, MICHIGAN.

SPRING-SPOKE WHEEL.

1,118,487.   Specification of Letters Patent.   Patented Nov. 24, 1914.

Application filed August 4, 1911. Serial No. 642,428.

*To all whom it may concern:*

Be it known that I, JOHN D. HAYMAN, a citizen of the United States of America, residing at No. 815 North Bond street, in the city of Saginaw, in the county of Saginaw, and State of Michigan, have invented a new and useful Spring-Spoke Wheel; and I do hereby declare the following to be a full, clear, and exact description of the invention, reference being had to the accompanying drawings, and to the characters of reference marked thereon, which form a part of this specification.

This invention relates to spring spoke or resilient wheels designed to be used in place of the costly pneumatic-tired wheels.

The objects of the invention are to provide a wheel in which are present all the advantages and none of the disadvantages of the pneumatic-tired wheel. Also to provide an improved spring spoke wheel wherein the spokes may be readily applied and removed, and when applied, are positively locked in place against accidental dislodgment.

A further object is to reinforce and strengthen the spokes in a novel manner.

Still another object is to provide a wheel which, when in use, will be practically noiseless, and one wherein the parts are not liable to get out of order.

To these and other ends the invention comprises certain new and useful devices, all of which will be more fully explained hereinafter and particularly pointed out in the claims.

In the accompanying drawings, Figure 1 is a side view of the spring spoke wheel, assembled, with a portion of the rim broken away, so as to show the way in which the spokes are locked to the felly; Fig. 2 is a detail perspective, showing a portion of the hub, felly and rim, connected by a few of the spring spokes, and disclosing the manner of attaching the spokes. Said figure also shows a portion of solid rubber which may be used as a tire; Fig. 3 is a section view of the assembled wheel, showing the different parts and sections and also showing the arrangement of the two rows of spring spokes; Fig. 4 is a perspective of a portion of the hub, partly broken away to show one of the sockets for holding the spring spokes, and the way in which the spring spokes fit into the hub, also the separating band between the spring spokes; Fig. 5 is a detail side view of a part of the hub, showing two spring spokes as they are attached therein, with a wedge-shaped key for attachment; Fig. 6 is a detail perspective of the wedge-shaped key; Fig. 7 is a detail perspective of one of the spring spokes, and a wedge-key; Fig. 8 shows the wedge-key, equipped with latch springs on the upper edge thereof.

The wheel 1 comprises a felly 3 bearing a tire 2 preferably of rubber, which may be of the solid or cushioned kind. A hub 10 encircled by the felly is connected therewith by flat steel spokes 6 adapted to yield or vibrate under weight or strain, and to cushion or absorb the shocks incident to striking obstructions, ruts or holes in the roadway, so that jars or jolts caused thereby will not be felt by persons riding in vehicles equipped with my invention.

The spring spokes 6 are preferably bent into substantially ogee shape, and I prefer to use two rows of spokes, as shown in Figs. 1 to 4 to impart double strength to the wheel and reduce the liability of its crowning or dishing, the bends in the respective rows of spokes lying in opposite directions.

The spokes are individually attachable and detachable relatively to the hub and felly, to enable repairs to be quickly and easily effected. To this end, the outer face or periphery of the hub and the inner face of the felly are each provided with a series of annularly arranged radially extending sockets 13, (Figs. 2 and 4), one wall of each of which is recessed as at 14, the base of each socket having formed therein a seat or depression 15, forming a lateral extension of the recess 14. The opposite ends of the spokes fit into the recesses 14 in the felly and hub, respectively, so that the outer flat sides of the spokes lie approximately flush with the walls of the sockets 13, and the walls of the recesses 14 prevent lateral shifting of the spokes. The extreme ends of the spokes are offset or bent over to form lips 7 which fit in the seats 15 in the bottoms of the sockets. The sockets are wedge-shaped or constricted at the open ends, and similarly shaped keys or retaining means 9 are inserted endwise into the sockets, the wide bases of the keys fitting over the inturned lips 7, and the sides of the keys snugly fitting against the walls of the sockets to lock the spokes in place. Endwise pull on the spokes thus tends to lock them more tightly against displacement since the lips then press the keys more firmly into the constricted openings of the sockets. I prefer to corrugate the side walls of the keys longitudinally, as shown in Fig. 6, such corrugations coacting with the side walls of the sockets to hold the keys and spokes in place and insure a better fastening.

The keys are held in position by rims or rings 4 and 11 fitting over and concealing the outer ends of the keys, in the felly and hub. Suitable fastenings as bolts pass transversely through the rims and the felly and hub to hold the rims in place. The outer edges of the rims 4 may extend beyond the outer periphery of the felly, as shown in Fig. 2 and over the sides of the tire 2, to prevent lateral displacement thereof.

The sockets 13 preferably extend from side to side of the hub and felly, respectively, to accommodate the inner and outer ends of both series of spokes 6, a single key for each socket being provided, as in Fig. 2, such key being insertable from either end of the socket.

Straightening rings or annular bands 5 and 12 may be arranged to encircle the hub and to be encircled by the felly, respectively, between the series of spokes to separate the latter to hold them in position and prevent contact while the wheel is in use, thereby eliminating noise. These rings reinforce the hub and felly.

The exposed edges of the respective keys may be provided with opposed spring latches 16 (Fig. 8), the effective ends of which face each other. When the key is inserted from one end of the socket, the first spring latch is crowded down by contact with the ring to pass beneath the latter until the free end of the latch escapes and springs up on the opposite side of the ring to prevent the withdrawal of the key, and the free end of the remaining spring latch, by contact with the ring prevents further insertion of the key. In this way, the keys are locked against accidental displacement.

The keys may be removed by pressing down one of the spring latches so that its end lies beneath the adjacent ring and then driving the key out of its socket. It will be noticed that no bolts, screws, rivets, or similar fastenings which are liable to become loose and rattle, are employed to hold the spokes in place.

Any spoke 6 may be removed independently of the others and without dismantling the wheel, by simply removing the rims 4 and 11 and dislodging the keys which lock the inner and outer ends of the spoke, repairs made and the spoke replaced.

The arrangement of the spokes is such that when the wheel strikes an obstruction or depression, the spokes below the hub are compressed to resist the weight or load, thereby allowing the hub to shift below the center of the wheel, while the spokes above the hub partially straighten to prevent too great a movement of the hub and to sustain part of the extra thrust, such movement of the hub, also being opposed by the spokes on the opposite sides of the hub, so that the jar or jolt is cushioned and the hub returns to its normal position without a sudden recoil. The number of spokes employed may be varied with the load to be supported.

Braces in the form of bosses 17 (Fig. 5) may be formed on the hub and felly, respectively beneath the bends of the spokes, to limit the flexure thereof and prevent breakage.

Changes may be made in the form and arrangement of the several parts without departing from the spirit and scope of this invention.

What I claim as new, is:—

1. In a spring wheel, the combination with a felly or rim; and a hub; of a series of resilient spokes to connect the felly and hub, the opposite ends of each spoke having lips formed thereon; the felly and hub each having sockets, which sockets are recessed to form seats; the inner and outer ends of the spokes being lodged in their respective seats, the side walls of which seats prevent lateral displacement of the spokes; and keys insertible into the sockets to contact with and overlie the lips, to prevent endwise withdrawal of the spokes.

2. A spring wheel comprising a hub having an annularly arranged series of substantially wedge-shaped sockets formed therein, with the constricted ends of the sockets at the outer periphery of the hub, a felly or rim having a similarly arranged series of sockets on its inner periphery, the constricted ends of which lie at the inner periphery of the felly, resilient spokes whose respective opposite ends enter the sockets in the hub and in the felly or rim, said ends terminating in lips bent at an angle to the spokes, keys conforming in shape to the sockets and laterally insertible thereinto with their broader edges or bases seated on and overlying the lips to prevent the dislodgment of the spokes, and means to hold the keys in place.

3. A spring wheel comprising a hub having an annularly-arranged series of substantially wedge-shaped sockets formed therein, with the constricted ends of the sockets at the outer periphery of the hub, a felly or rim having a similarly arranged series of sockets on its inner periphery, the constricted ends of which lie at the inner periphery of the felly, resilient spokes whose respective opposite ends enter the sockets in the hub and in the felly or rim, said ends terminating in lips bent at an angle to the spokes, corrugated keys conforming in shape to the sockets and laterally insertible thereinto with their broader edges or bases seated on and overlying the lips to prevent the dislodgment of the spokes, and means to hold the keys in place.

4. A spring wheel comprising a hub member, a rim member, and a series of resilient spokes connecting the members, one of which members has an annularly-arranged series of sockets, the open ends of which are constricted, and one side wall of each socket being recessed and communicating with a depression in the bottom of the socket, the end of each spoke being seated in the recess in its respective socket and having a bent lip to fit in the depression, retaining means inserted into the sockets to overlie the lips and prevent their withdrawal, and devices to hold the retaining means in place.

5. A spring wheel comprising a hub member, a rim member, and a series of resilient spokes connecting the members, one of which members has an annularly arranged series of sockets, the open ends of which are constricted, and one side wall of each socket being recessed and communicating with a depression in the bottom of the socket, the end of each spoke being seated in the recess in its respective socket and having a bent lip to fit in the depression, corrugated keys inserted into the sockets to overlie the lips; said keys corresponding substantially in shape with the sockets, to prevent endwise withdrawal of the spokes, and means to retain the keys in place.

6. A spring wheel including a hub having a series of sockets extending thereacross, and each socket having a constricted peripheral opening, a felly, a double series of spring spokes having bent inner ends, seated in the sockets in pairs, the outer ends of the spokes being secured to the felly, separating and strengthening rings located between the respective series of spokes and adjacent the felly and hub, respectively, and a single means insertible into each socket to prevent withdrawal of the inner ends of the pair of spokes seated therein.

7. A spring wheel including a hub having a series of sockets extending thereacross, and each socket having a constricted peripheral opening, a felly, a double series of spring spokes having bent inner ends, seated in the sockets in pairs, the outer ends of the spokes being secured to the felly, separating and strengthening rings located between the respective series of spokes and adjacent the felly and hub, respectively, a single key insertible into each socket from either face of the hub to overlie the bent ends of the pair of spokes seated therein, and prevent endwise withdrawal of the spokes, and means to hold the keys in place.

8. The combination, in a spring wheel, including a felly or rim member; and a hub member; of a double set of spring spokes to connect the felly and hub; one of said members having a series of sockets entered by the adjacent ends of the spokes; keys insertible in the sockets to secure the spokes; a separating ring between the respective sets of spokes; and yielding latches on the keys to engage the separating ring and lock the keys in place.

9. The combination in a spring wheel, of a hub, and a felly or rim, one of which is provided with sockets having constricted openings, one wall of each socket being recessed, spring spokes having bent ends seated in said recesses, removable keys corresponding in shape to the sockets and insertible thereinto to contact with and overlie the bent ends of the spokes to prevent endwise withdrawal of the spokes, and means to retain the keys in place.

JOHN D. HAYMAN.

In witness whereof and to signature of John D. Hayman we have hereunto set our hands:
C. M. Browne,
D. Jennie Savage.